March 2, 1926.  H. S. CLAPP  1,575,605
HARVESTER
Filed Dec. 6, 1924    5 Sheets-Sheet 1

Inventor
Harry S. Clapp
By Edward E. Clement
Attorney

March 2, 1926.

H. S. CLAPP 1,575,605

HARVESTER

Filed Dec. 6, 1924          5 Sheets-Sheet 2

Inventor
Harvey S. Clapp,
By Edward E. Clement
Attorney

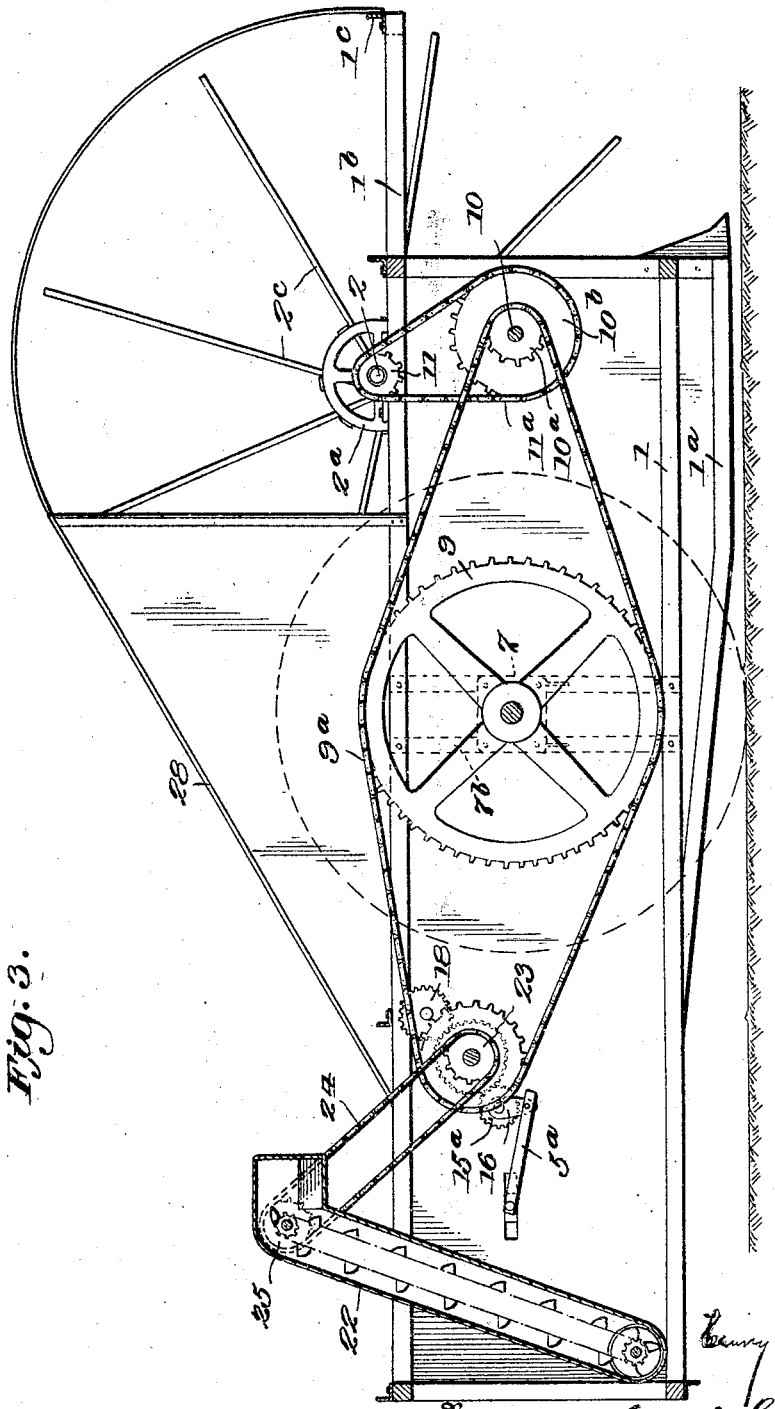

March 2, 1926.
H. S. CLAPP
HARVESTER
Filed Dec. 6, 1924
1,575,605
5 Sheets-Sheet 4
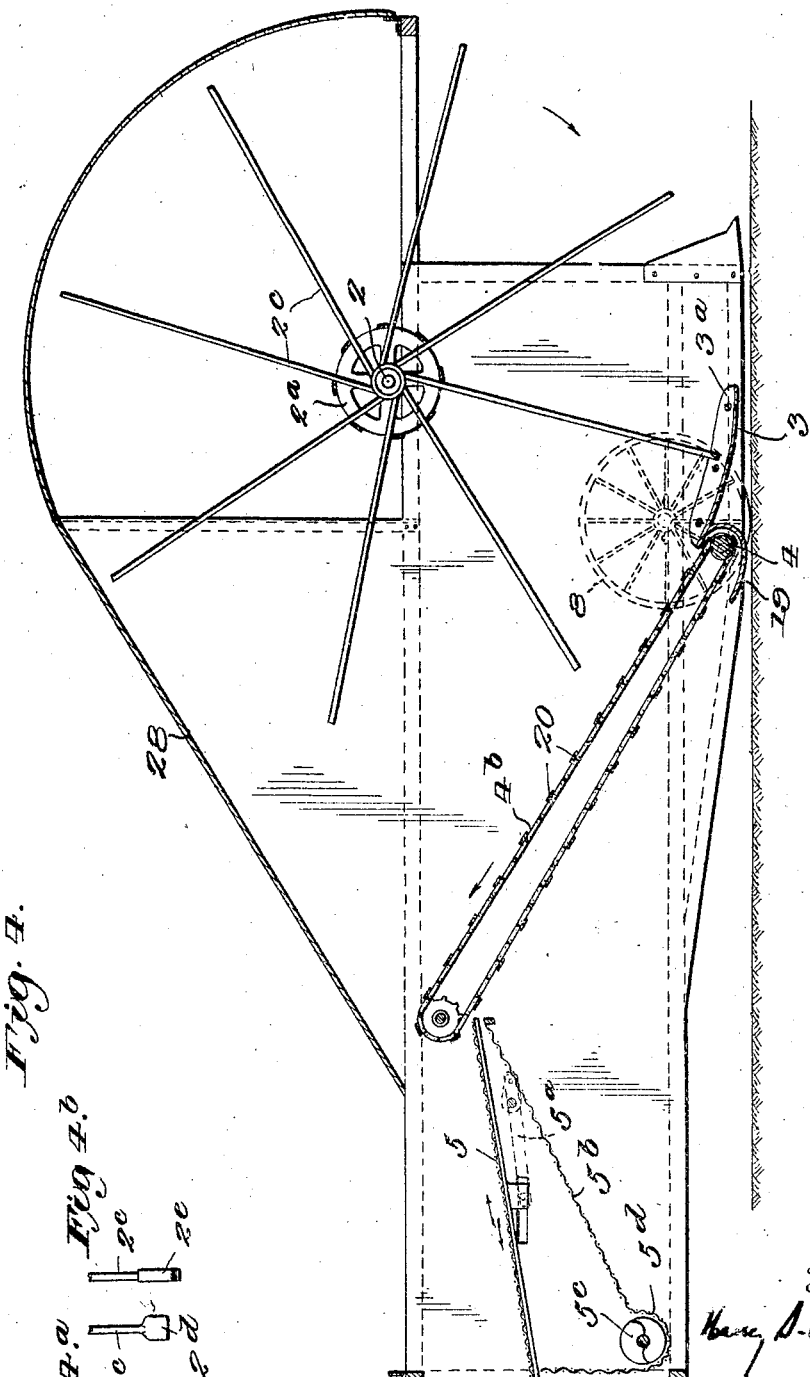
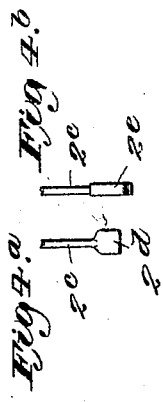

March 2, 1926.

H. S. CLAPP

HARVESTER

Filed Dec. 6, 1924

Patented Mar. 2, 1926.

1,575,605

UNITED STATES PATENT OFFICE.

HARVEY S. CLAPP, OF ACCOTINK, VIRGINIA.

HARVESTER.

Application filed December 6, 1924. Serial No. 754,321.

*To all whom it may concern:*

Be it known that I, HARVEY S. CLAPP, a citizen of the United States, residing at Accotink, in the county of Fairfax and State of Virginia, have invented certain new and useful Improvements in Harvesters, of which the following is a specification, reference being had therein to the accompanying drawing.

My invention relates to improvements in harvesters and more particularly to those machines designed to harvest soy beans and the like.

The object of my invention is to produce a machine of wider adaptability than those heretofore available, and one which will maintain a uniform standard of efficiency under varying conditions of the crop, so that it may replace so-called one row machines, as well as multiple row machines, without a high clearance and without the requirement of expert driving. Other objects are to provide a machine which will satisfactorily harvest the crop where the beans are sown in close rows, which at the present time is common practice; which will be capable of picking the beans when the vines have fallen down; which will also harvest beans with speed and efficiency though the vines have fallen down or are tangled; which may be adapted for other plants besides soy beans; and finally which will maintain a continuous rearward progression of the beans that cross the receiving bar or table without the formation of pockets or any tendency to forward dribble or loss.

Very briefly stated, I attain my objects by providing a machine with a continuous transverse front edge on a receiving bar or table adjusted close to the ground so as to receive all plants without regard to any row arrangement, and mounting above this a beater which may be detachable and interchangeable with others, of different types and different patterns for other plants besides soy beans, and which is provided with a sufficient number of beater arms suitably arranged and properly driven to cover every portion of the receiving bar or table by its strokes at intervals shorter than the shortest period in which forward movement or loss of the beans due to gravity could take place. Other features of the mechanism will sufficiently appear from the detailed description hereinafter.

My invention is illustrated in the accompanying drawings, in which:

Fig. 3 is a longitudinal vertical section on the line 3—3 of Fig. 2 showing the rear members in detail.

Fig. 4 is a longitudinal vertical section on the line 4—4 of Fig. 2 showing the left side members, and Fig. 4$^a$ is a fragmentary view of the end of a beater arm with a flattened and broadened tip, to better cover the surface of the receiving table.

Fig. 4$^b$ is a similar view showing a rubber wiper on the end of a beater arm.

Figure 5:
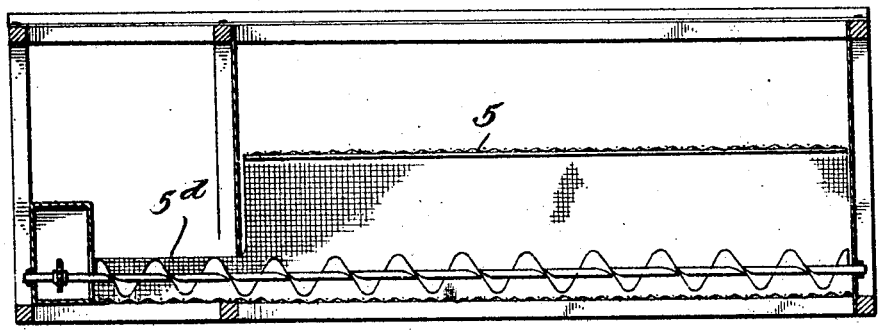

Fig. 5 is a side view of the shaker member.

Figure 2:
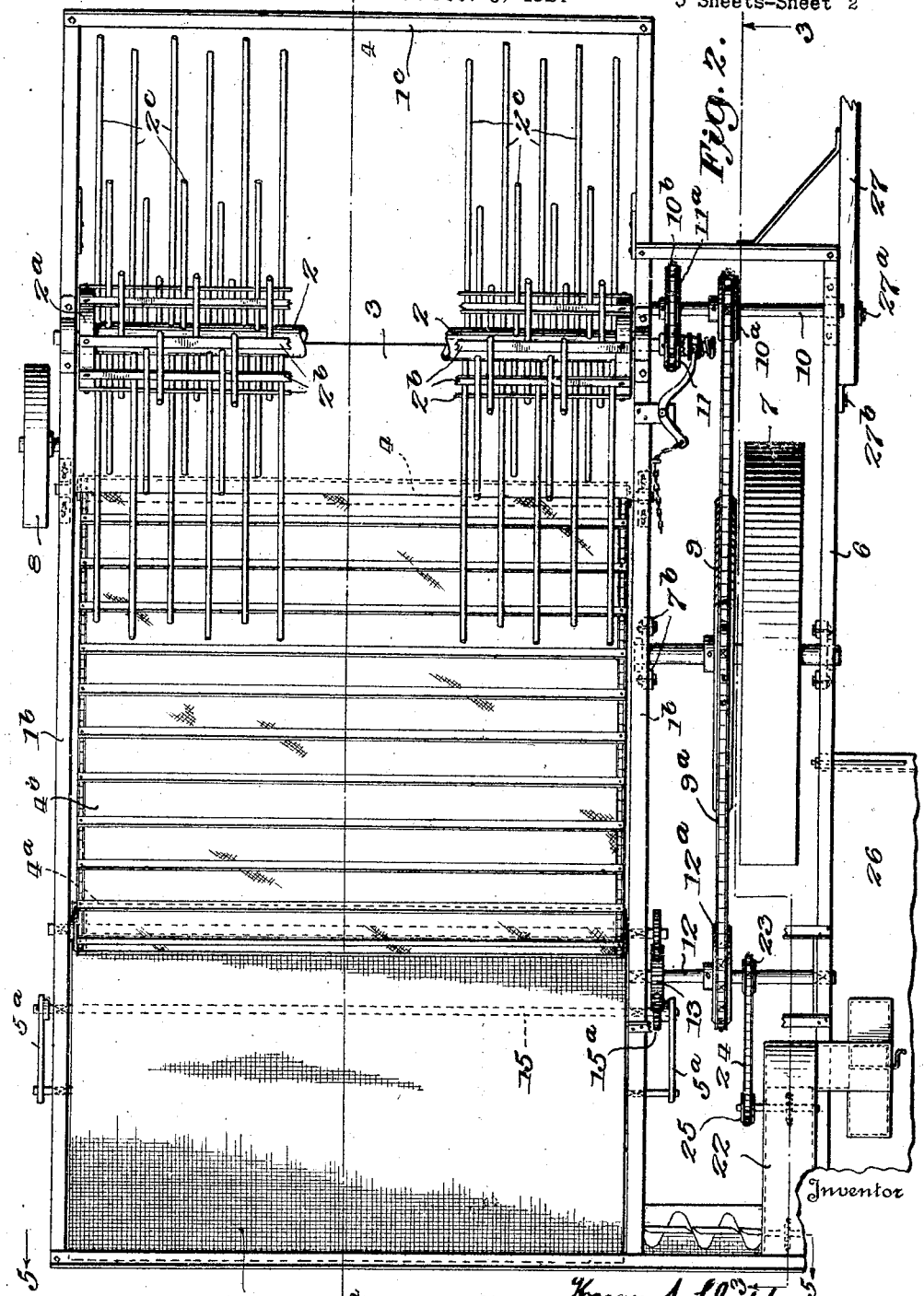
Fig. 2 is a plan or top view of the same.
Figure 6:
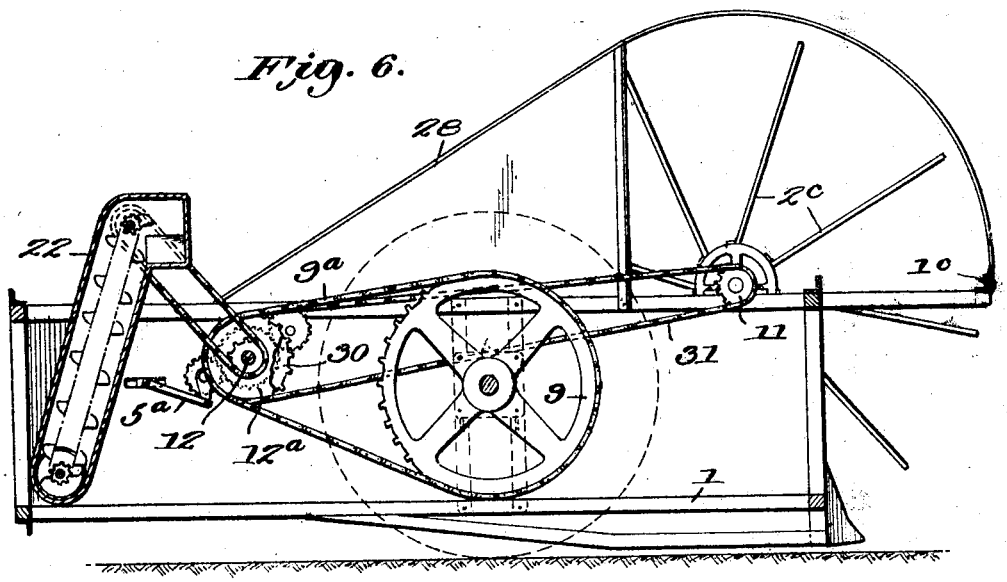

Fig. 6 is a side view of a modification of the apparatus shown in Fig. 2.

Referring to the drawings in detail, 1 is the main frame, across the bottom of which, near the front, is a bar or receiving table 3, which strikes against the vines close to the ground. The bottom member of the frame 1$^a$ is higher at the rear to give more clearance. The top side members 1$^b$ project forward, with a cross piece 1$^c$ to stiffen the frame. Across the top of the frame and directly over the bar that strikes the vines is mounted the shaft 2 on which is mounted the cylinder carrying beater arms.

At the ends of the shaft 2, and close to the inside of the frame members 1$^b$, are mounted spiders 2$^a$, turning with the shaft. Horizontal cross members 2$^b$ connect the spiders, making a kind of drum. Beater arms 2$^c$, are arranged at right angles to the shaft with their inner ends secured thereto. They rest against the cross members and are so driven around when the cylinder revolves. The number and shape of the beater arms is optional depending upon the type of product to be harvested. They may be shaped round, and for some work have several links of chain attached at their ends.

Immediately at the rear of bar 3, a roller 4 is extended the full width of the frame. Just below the top and spaced away from the rear end of the frame, is a corresponding roller 4$^a$, (best shown in Fig. 4). These rollers carry a canvas conveyor 4$^b$ which when the machine is in operation elevates the product from bar 3 where the beater arms 2$^c$ have thrashed it from the vines, and drops it on the screen 5. This screen extends from side to side of the frame. It slopes to the rear, the angle being adjustable, and is moved or shaken back and forth by a pitman rod 5ª. Thrash or ditritus is carried over the rear of this screen and the grain passes through it into a pan 5ᵇ, which is attached below the screen and has the same shaking motion imparted by the pitman rod. The pan is equipped with a screen bottom 5ᶜ of fine mesh allowing small weed seeds and the like to pass through. It slopes to the right hand side of the frame and has a spout 5ᵈ which projects through the frame.

Figure 1:
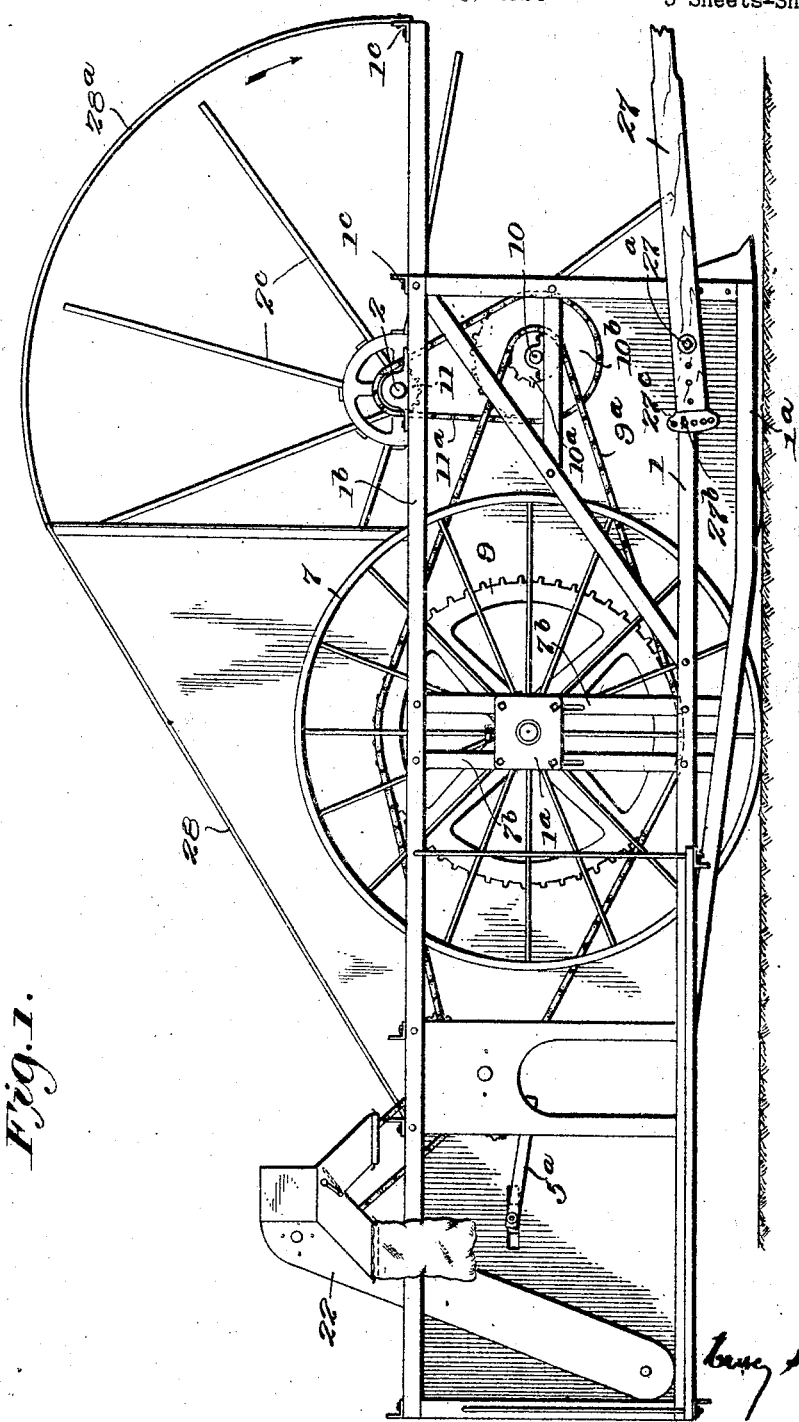
Fig. 1 is a side elevation of the machine.

On the right hand side of the main frame the drive frame 6 is mounted, best shown in Fig. 2. This is set away from the main frame, having the same length and height as that frame. Between the two frames, a drive wheel 7, is mounted on a bearing 7ª, which is adjustable as to height on the members 7ᵇ, (see Figs. 1 and 3.) On the left hand side of the frame the wheel 8 is mounted, also on an adjustable bearing, and is situated forward of the main drive wheel, in such position as to properly balance the harvester.

On the inside of the main drive wheel 7, is mounted a main drive sprocket 9, having (in the machine beforementioned) 48 teeth, and turning with the main drive wheel at an average speed of 14 R. P. M. A forward counter shaft 10 is arranged on the frame, below and slightly to the front of the beater shaft 2, with a small drive sprocket 10ª, having 8 teeth, mounted thereon; and being connected with and driven by the main drive sprocket, by a link chain 9ª. This drive sprocket 10ª and the shaft on which it is mounted will thereby be turned at the rate of 84 R. P. M.. which the main drive sprocket is turning at its average speed. A second, beater drive, sprocket 10ᵇ is arranged on the shaft 10, having for example 24 teeth. This is connected with, and drives a beater sprocket 11, fixed on the beater shaft 2, at the right of the main frame, by the beater drive chain 11ª. When the beater sprocket 11 has for example 8 teeth, the beater will be turned by the beater drive sprocket 10ᵇ at the rate of 252 R. P. M., when the main drive wheel 4 feet in diameter is turning at its average speed, which is when the machine is moving at the rate of 2 miles per hour. The proportions and dimensions of these several parts may of course be changed, but it is essential for the purposes of this invention that the speed of the beater drum be maintained at approximately the number of revolutions stated, using beater arms approximately three feet in length, and spaced as illustrated herein. Where a power drive is employed, separate from the traction wheels or drive, this speed can of course be regulated without reference to the dimensions of the machine. Such separate power drives are now available with the ordinary commercial tractors.

To the rear of the main drive wheel is a rear countershaft 12, on which is fixed the drive sprocket 12ª which meshes with and is turned by the main drive chain 9ª. On the inner side of the countershaft 12, is fixed a drive gear 13, which meshes with a shaker drive gear 15ª which is fixed to a shaft 15. Shaker cranks 16, are attached at the ends of the shaft 15. Shaker connecting or pitman rod 5ª connects the shaker cranks 16 with the screen (best shown in Fig. 3).

The rear counter shaft drive gear 13 also meshes on its opposite side with a drive gear 18, fixed on the shaft of roller 4ª, immediately at the right of the main frame. This gear turns, together with the roller, at a proper speed to keep the canvas conveyor 4ᵇ moving upward at a speed sufficient to carry the beans from the bar 3 to the screen, with efficiency.

In order to effect a change of speed in the beater member the gears 10ª and 12ª are fixed to their shafts so as to be removable and interchangeable, i. e., when interchanged the beater drive gear 12ª being larger than 10ª will be turned at a slower proportionate rate and the speed of the beater will be similarly affected.

A modification of this feature of the apparatus is shown in Fig. 6. In this form of the apparatus the shaft 10 and the gears 10ª and 10ᵇ are eliminated; the chain 9ª extending only around the gears 9 and 12ª. An additional gear 30 is fixed on the shaft 12 and is connected directly by chain 31 to the gear 11. The gears 30 and 31 are in proportion as to their relative diameters and number of teeth, so that the beater will be turned by the gear 11 at the desired rate of speed. This design has been found to be very effective and efficient in operation.

To the rear of the drive frame, a bagging elevator 22 is attached, at a place where its boot receives the spout from the grain pan. A drive sprocket 23, for this elevator, is arranged on the rear countershaft 12, adapted to mesh with a malleable link chain 24, which in turn meshes with a bagging elevator sprocket 25, of the same size as the sprocket 23 and actuated by the same. This sprocket is geared to a screw arrangement 22 comprising the elevator, whereby the grain is raised to a detachable platform 26 on the right of the frame and passed into bags.

A tongue 27 is attached to the outside of the drive frame so adjusted that the tractor or horses are on the ground that has already been harvested. This tongue is arranged so that it may be suitably adjusted when the main drive wheel is adjusted as to height, being pivoted at 27 and adapted to be secured by the bolt 27$^b$ in one of the holes 27$^c$.

A hood 28 closed in at the sides as indicated in Figs. 1, 3, 4 and 6 is arranged over the beater for the protection of the same. This also serves as an air blast casing, and to prevent accidental contact of external objects with the high speed beater arms.

It will be seen from the foregoing description that the operation of the machine while extremely simple, is highly efficient. At the moment that the bar strikes the vines from behind, they are struck from in front by the rapidly revolving beater arms. The beans are shelled out and with some trash and weed seeds, are thrown back on to the elevator belt or conveyor. This carries them to the rear and upper part of the machine and drops them onto the screen, the shaking of which causes the beans to go through into the pan, attached below. The trash is shaken off at the rear. The shaking of the pan allows the weed seeds and the like to escape through its screened bottom and carries the beans to the spout and through it into the bottom of the bagging elevator, which raises them to the upper part of the machine where they are bagged.

The embodiment of the invention as shown is susceptible to changes within the scope of the claims, but in any such changes the critical speed of the beater arms must of course be maintained, as this is one of the characteristic features of the invention.

In Fig. 4 of the drawing it will be noted the receiving table 3 is shown as curved on an arc of which the center lies in the axis of the beater arm shaft. The conveyor 4$^b$ projects beneath the rear edge of this table.

The hood or cover 28 shown in Figs. 1, 3, 4 and 6 may be and preferably is extended forward around the beater as shown at 50 in Fig. 4 to provide a casing for the beater arms to produce an air blast as indicated by the arrows which acts upon the seed or grain in the general direction of the conveyor, passing out at the rear end of the machine. This also acts downwardly upon the plants as they meet the edge of the table 3, and assists in continuously forcing the grain or seed backward onto the conveyor and from it to the screen 5.

As one of the most troublesome faults to be overcome in the methods heretofore practiced has been the tendency of the seed or grain to deviate from the direct line of the beater strokes and by falling back under the influence of gravity to form "pockets", by which a very considerable percentage of the product has been either lost or interposed as an impediment to the efficient operation of the machine, I have found it necessary to eliminate this by positive acting means, as follows: The edge of the table 3 is advanced progressively and continuously against the crop in one direction, while the flailing strokes of the beater arms 2$^c$ are applied in the reverse direction. The time element or recurring period of these strokes is of importance, as they not only serve to beat out the grain or seed, but also to propel the product rearwardly onto the conveyor 4$^b$. Each species of grain or seed, such as soy beans, peas or grain, has its own mass of subdivided units, which means that at a given rate of motion a certain amount of energy can be stored for each stroke, according to the laws of inertia, and each has its own time element or time factor, or natural period, by which I mean the time required to discharge the amount of energy imparted by one stroke and to commence to fall back under the influence of gravity or other forces, which is the cause of the formation of pockets. By regulating the speed of the beater arms so that the period or elapsed interval between strokes is less than the time period or interval of the seed or grain for motion in the reverse direction, I produce a continuous motion. It is to be specially noted that other means can be employed for this purpose as well as the beater arms. For example, an air blast may be introduced above or below the table, or separate mechanical means may be provided, receiving motion from the power transmission system. I prefer to use the beater arms however, for the following reason: In my preferred construction the beater is formed of a metal cylinder mounted upon the central shaft 2, through which the arms project in pairs staggered from end to end of the cylinder, so that they present a helical formation as indicated in Fig. 2. In the machine illustrated, there are forty-two pairs of arms or eighty-four single arms in a drum seventy-two inches long. I adjust my power transmission means so that this drum is driven at the rate of 250 R. P. M., which means that for any given point on the receiving table 3, throughout its entire length from side to side of the machine, the end of a beater arm will pass over that point at intervals of about ⅛ of a second, which is therefore the period of these strokes. Moreover, since there are forty-two pairs of arms, equally spaced, the entire surface of the table 3 is covered at recurring intervals of ⅛ of a second in cycles preferably staggered or helical in their sequence, but not necessarily so. The arms might be set in parallel rows, although not herein so illustrated, and not so used in practice up to this time. The inclination of the conveyor and the receiving table, if the latter is inclined, is such as to lessen the direct effect of gravity, and the natural tendency of the grain or seed as units or in masses, to fall back and form pockets is completely obviated, since the time required for such action is much greater, as before stated, than the recurring intervals between strokes of the beater arms.

In order to more fully cover the surface of the receiving table, the ends of the beater arms may be flattened as shown in Fig. 4ª and to prevent side pockets at the sides of the machine, the table 3 may be provided with baffle plates or end guard plates 3ª (see Fig. 4). The beater arms may also be provided with flexible extension members 2ᵉ as shown in fragmentary Figure 4ᵇ, these extension members being of rubber or other material suitable for the purpose, and either in contact with or close to the surface of the table.

After reading this description it will be understood that aside from the specific apparatus presented, the invention embodies a method of operation capable of being practiced with other apparatus. I believe it to be novel and original with me to produce continuous flailing and attendant continuous motion of the products removed from the plants, without the formation of pockets in the manner described. I further believe it to be original with me to flail the crop plants while standing, according to the broad method described and I shall claim the same accordingly.

What I claim is:

1. A harvester for beans and the like comprising a frame open in front, a receiving table extending across the lower front part of the frame, transverse journal bearings carried on the upper part of the frame, approximately in a vertical plane through the front edge of said table, a transverse beater shaft having its ends journaled in said bearings, and a series of elongated separate individual beater arms extending out radially from said shaft of such a length as to just clear the upper surface of said table, and so spaced and arranged with respect to each other and to the dimensions of the product to be harvested along and around the shaft that when the latter is rotated, substantially every unit of area on said table surface of approximately the magnitude of a unit of said product will be swept over by a beater arm in each revolution of the shaft, together with suitable conveyer means extending from beneath the rear edge of the table to the upper part of the rear of the frame, cleaning and gathering means arranged in the rear of the frame to receive the product of the beater from said conveyer, and power actuating means for the beater, conveyer and other members.

2. The harvester claimed in claim 1, having the beater arm set in open grouping around the beater shaft, so that the planes of rotation of the beater arms are closer together than the approximate diameter of the seed to be harvested, while the arms in a given axial plane are themselves separated from each other sufficiently to permit the passage between them of the vines or plants being operated on.

3. The harvester claimed in claim 1, having the beater arms set helically around the beater shaft, whereby the planes of rotation of the beater arms are closer together than the approximate diameter of the seed to be harvested, while the arms in a given axial plane are themselves separated from each other sufficiently to permit the passage between them of the vines or plants being operated on.

4. The harvesting machine described in claim 1, in which the power actuating means, the beater shaft, and the beater arms are so timed in relation to the weight of the crop and its height from the ground, that the ends of the beater arms will supply sufficient initial velocity to throw the beaten out product upwardly across the table and onto the conveyer without sufficient time between any two successive strokes over the same area or spot to permit the product to fall substantially below its initial level.

In testimony whereof I hereunto affix my signature.

HARVEY S. CLAPP.